Patented Apr. 14, 1925.

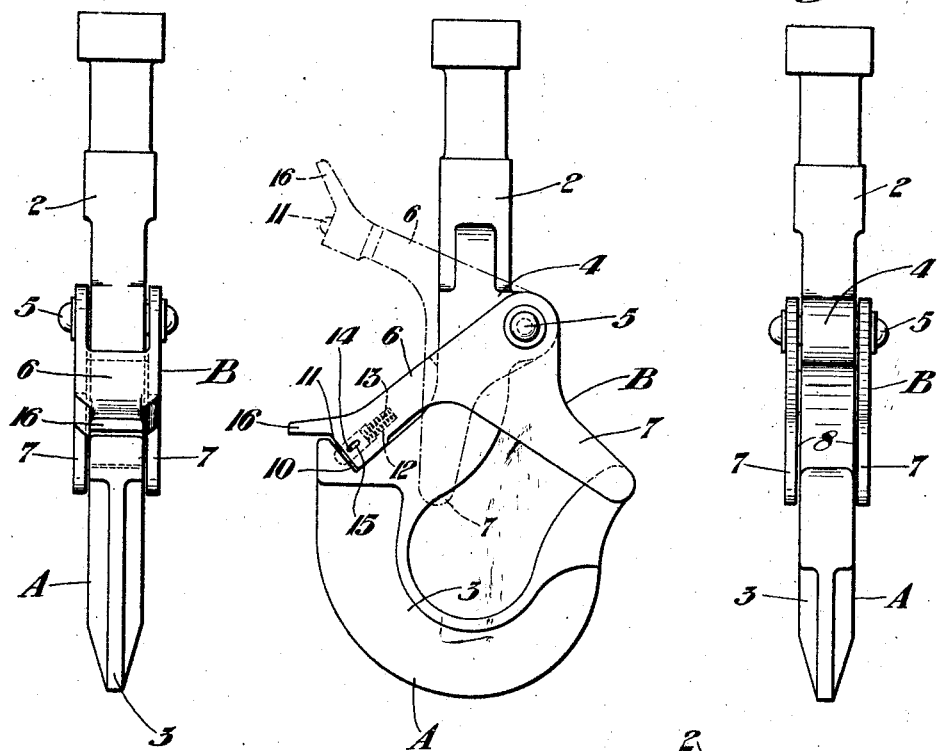

1,533,995

UNITED STATES PATENT OFFICE.

PAUL LANG, OF CLEVELAND, OHIO, ASSIGNOR TO THE AMERICAN STEEL AND WIRE COMPANY OF NEW JERSEY, A CORPORATION OF NEW JERSEY.

HOOK.

Application filed January 5, 1924. Serial No. 684,570.

*To all whom it may concern:*

Be it known that I, PAUL LANG, a citizen of the United States, and resident of Cleveland, in the county of Cuyahoga and State of Ohio, have invented certain new and useful Improvements in Hooks, of which the following is a specification.

This invention relates to improvements in hooks and has particular application to hooks adapted especially for use in connection with hoisting and conveying apparatus, and has for its object the provision of a novel closure member adapted to close the space between the nose or point of the hook and shank and thus prevent the accidental displacement of the carrier chain, sling, bucket bail or the like, carried by the hook.

Another object is to provide a novel form of locking mechanism for locking the closure member in closing position.

A still further object is to provide a hook having the novel features, construction, and combination of parts hereinafter described and illustrated in the accompanying drawings.

In the drawings, Figure 1 is a side elevation of a hook embodying this invention.

Figure 2 is a front elevation and Figure 3 is a rear elevation thereof.

Figure 4 is a side elevation, partly in section, showing details in the construction of the hook forming this invention.

Referring more particularly to the drawings, the letter A designates the hook as a whole, and the letter B designates the closure or safety latch as a whole.

The hook A is composed of the usual shank portion 2 and a curved or hook shaped head portion 3. A suitable lug or projection 4 is provided on the forward side of the shank 2 above the head 3 and forms a bearing for the closure member B, which is pivotally connected on said lug by a pin 5 which passes through suitable apertures in the member B and lug 4.

The closure member B is substantially V-shaped and of one piece or integral construction, one leg of which forms an operating arm or lever 6 and the other leg forms a closure arm 7. The member B is slotted for a portion of its length, as at 8, to permit it to fit over or around the shank 2 and head 3. That is, the hook A is mounted in the slot and the pin 5 is passed through the one side of the member B, through the lug 4 and then through the other side of the member B, so that in operation the sides of the closure arm 7 will be engaged on both sides of the point or nose of the head 3.

The rear leg or operating arm 6 is adapted to be seated in an offset or notch 10 in the rear face of the head 3 when the closure arm 6 is bridged across the space between the shank 2 and nose of the head 3, and to be locked in this position by a yieldable latch or lock.

The yieldable latch or lock is mounted in the lever or arm 6 and comprises latch pin 11 mounted in a recess 12 in the lever 6 and extending outwardly through the end face of said lever so as to engage in a keeper depression 12ª in the face of notch 10. A coil spring 13 is mounted in the recess 12 between the end of said latch pin 11 and the end of the recess and tends to normally force said pin outwardly. A retaining pin 14 is mounted in the latch pin 11 and projects outwardly through suitable elongated slots 15 in the arm or lever 6 so as to limit the reciprocating movement of the latch pin 11.

A lug 16 extends rearwardly from the end of the arm or lever 6 and serves as a finger or handhold to be engaged when it is desired to operate the closure member B.

In operation, assuming that the closure member B is in the position shown in Figure 1, it will be either rotated about the pivot pin 5 manually, or the lifting chain or other article will be forced against the arm 7 with sufficient force to rock the member B about its pivot, in a clockwise direction, thus opening the space between the shank 2 and the point or nose of the head 3, so as to permit the lifting chain to pass onto the hook. After the chain or other lifting element is mounted on the hook the closure B will be forced around the pivot pin 5 in a counter-clockwise direction, so as to bridge the arm 7 between the shank 2 and hook 3 and to cause the end of the lever 6 to fit within the notch 10, and causing the latch pin 11 to become seated or latched in the depression 12ª.

While I have illustrated and described only one embodiment of my invention it will be understood that various changes in the design, construction and combination of parts may be made without departing from the scope of my invention as defined in the appended claims.

I claim:—

1. The combination with a hoisting hook comprising a shank portion and a curved or hook shaped head portion, of a substantially V-shaped closure member pivotally connected at its apex to said shank for closing the space between the point or nose of said head and said shank, one of the arms of said V-shaped member operating as a closing arm and being adapted to close the space between said shank and the nose of said head, and the other of said arms being adapted to function as an operating arm or lever, said head being provided at its rear side with a suitable notch adapted to be engaged by the end of said operating arm or lever when said closure arm is bridged across the space between said shank and the nose of said head, a yieldable spring pressed latch mounted in said operating arm and projecting through the end thereof and adapted to enter a suitable recess in the wall of said notch, and a projection adjacent the end of said operating arm adapted to form a hand hold to facilitate operation of said closure member.

2. The combination with a hoisting hook comprising a shank portion and a curved or hook shaped head portion, of a closure member, said closure member being of a substantially V-shape and being bifurcated from the end of one arm through the greatest portion of its length, said closure member being pivotally mounted in an inverted position on said hook with its bifurcated portion fitted around said shank, and being pivotally connected at its apex to said shank, the bifurcated arm of said closure member operating as a closing arm and being adapted to close the space between said shank and the nose of said head, and the other of said arms being adapted to function as an operating arm or lever, said head being provided at its rear side with a notch adapted to be engaged by the end of said operating arm or lever when said closure arm is bridged across the space between said shank and the nose of said head, and a yieldable spring pressed latch mounted in said operating arm and projecting through the end thereof and adapted to enter a suitable recess in the wall of said notch.

In testimony whereof, I have hereunto signed my name.

PAUL LANG.